United States Patent
Sidi et al.

(10) Patent No.: US 9,160,496 B2
(45) Date of Patent: Oct. 13, 2015

(54) METHODS AND APPARATUS FOR H-ARQ PROCESS MEMORY MANAGEMENT

(75) Inventors: Jonathan Sidi, San Francisco, CA (US); Samson Jim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2366 days.

(21) Appl. No.: 11/771,254

(22) Filed: Jun. 29, 2007

(65) Prior Publication Data
US 2009/0006778 A1 Jan. 1, 2009

(51) Int. Cl.
*H04L 1/18* (2006.01)

(52) U.S. Cl.
CPC .............. *H04L 1/1835* (2013.01); *H04L 1/1812* (2013.01); *H04L 1/1845* (2013.01)

(58) Field of Classification Search
CPC .......................... H04L 1/1812; H04L 1/1835
USPC .......................................... 709/240; 714/748
See application file for complete search history.

(56) References Cited

U.S. PATENT DOCUMENTS

| | | | |
|---|---|---|---|
| 6,678,523 B1 * | 1/2004 | Ghosh et al. ................. | 455/442 |
| 6,700,867 B2 * | 3/2004 | Classon et al. ............... | 370/216 |
| 7,050,397 B2 * | 5/2006 | Cheng et al. ................. | 370/235 |
| 7,079,489 B2 * | 7/2006 | Massie et al. ................ | 370/236 |
| 7,155,655 B2 * | 12/2006 | Cheng ........................... | 714/748 |
| 7,177,658 B2 | 2/2007 | Willenegger et al. | |
| 7,496,335 B2 | 2/2009 | Nibe | |
| 2002/0004924 A1 | 1/2002 | Kim et al. | |
| 2003/0118031 A1 * | 6/2003 | Classon et al. .............. | 370/395.54 |
| 2005/0094878 A1 * | 5/2005 | Becker ........................ | 382/205 |
| 2006/0195576 A1 | 8/2006 | Rinne et al. | |
| 2006/0268789 A1 | 11/2006 | Yu et al. | |
| 2007/0189206 A1 * | 8/2007 | Chandra et al. .............. | 370/328 |
| 2007/0245201 A1 * | 10/2007 | Sammour et al. ............. | 714/748 |
| 2008/0065944 A1 * | 3/2008 | Seol et al. ................... | 714/748 |
| 2008/0276147 A1 * | 11/2008 | Gho et al. .................... | 714/748 |

FOREIGN PATENT DOCUMENTS

EP    1389847 A1    2/2004

(Continued)

OTHER PUBLICATIONS

European Search Report—EP08153619, Search Authority—The Hague Patent Office, Jun. 22, 2009.

(Continued)

*Primary Examiner* — Asghar Bilgrami
(74) *Attorney, Agent, or Firm* — Donald C. Kordich

(57) ABSTRACT

Methods and apparatus are presented for H-ARQ process dynamic memory management. A method for dynamically managing memory for storing data associated with H-ARQ processes is presented, which includes receiving a packet associated with a H-ARQ process, determining if a free memory location is available in a H-ARQ buffer, assigning the packet to the free memory location, determining if the packet was successfully decoded, and retaining the packet in the assigned memory location for combination with a subsequent packet retransmission if the packet was not successfully decoded. Also presented are apparatus having logic configured to perform the presented methods.

21 Claims, 5 Drawing Sheets

(56) References Cited

FOREIGN PATENT DOCUMENTS

| EP | 1583273 | A2 | 10/2005 |
|----|---------|----|---------|
| EP | 1617584 |    | 1/2006  |
| MX | 2008009892 | A | 10/2008 |
| TW | I234407 | B  | 6/2005  |
| TW | I271955 | B  | 1/2007  |
| WO | 2004015906 |  | 2/2004  |
| WO | 2005125226 | A2 | 12/2005 |
| WO | 2007092257 | A1 | 8/2007  |

OTHER PUBLICATIONS

European Search Report—EP11190821—Search Authority—The Hague—Mar. 7, 2012.

International Search Report and Written Opinion—PCT/US2008/068664, International Search Authority—European Patent Office—Jul. 11, 2008.

Taiwan Search Report—TW097124361—TIPO—Jun. 13, 2012.

\* cited by examiner

METHODS AND APPARATUS FOR H-ARQ PROCESS MEMORY MANAGEMENT

FIELD OF DISCLOSURE

The embodiments of the disclosure relate generally to memory management techniques for memories provided within User Equipment (UE), and more specifically, to managing HSDPA (High Speed Downlink Packet Access) Hybrid Automatic Repeat Request (H-ARQ) processes associated with the interaction between the UE and a network for the transmission of traffic data.

BACKGROUND

Wireless data services are expected to grow in the near future and will likely become a significant source of traffic and revenue for network service providers. The High-Speed Downlink Packet Access (HSDPA) standard was developed in an effort to meet this growing demand. HSDPA may be thought of as a set of channels and procedures supported in 3GPP, Release 5 and later, enabling high speed packet data transmission on the downlink. HSDPA can provide a roadmap for Universal Mobile Telecommunications System (UMTS) based networks to increase their data transfer speeds and capacity. HSDPA enhances Wideband Code Division Multiple Access (WCDMA) technology through, among other improvements, the utilization of additional shared data channels, allowing statistical multiplexing among users, the application of different adaptive modulation and coding techniques, and fast, channel-aware scheduling at the base station. HSDPA can also improve the speed of error recovery by utilizing a fast retransmission mechanism called Hybrid Automatic Repeat Request (H-ARQ) with Stop and Wait (SAW) protocol.

FIG. 1 depicts a top-level interaction among exemplary elements of a WCDMA/HSDPA network 100, which may include a base transceiver station 105 (hereinafter referred to as "Node B") and a User Equipment (UE) device 110. The UE 110 includes a memory buffer 115 having a conventional arrangement. Various other elements which may exist within the network 100 are not shown for simplicity. Node B 105 may be in communications with UE 110 across various air interfaces or channels. The High Speed Downlink Shared Channel (HS-DSCH) may be used as the primary radio bearer which can transfer traffic data packets between Node B 105 and the UE 110. Support for the HS-DSCH operation of UE 110 may include additional two control channels, the High Speed Shared Control Channel (HS-SCCH) and the High Speed Dedicated Physical Control Channel (HS-DPCCH). The HS-SCCH may provide signaling information to the UE which may include H-ARQ related parameters and information regarding whether a packet is a new transmission or a retransmission. The HS-DPCCH may provide feedback information to Node B which may include a Channel Quality Indicator (CQI). The HS-DPCCH may also provide Acknowledgment (ACK)/Negative Acknowledgement (NACK) feedback generated by the UE 110 (which may be based upon, for example, a Cyclic Redundancy Check (CRC) within the UE 110).

H-ARQ processing can enable faster recovery by storing corrupted packets in the UE 110 rather than discarding them. When a corrupted packet is received, the UE 110 may store it in a H-ARQ buffer contained in a buffer memory 115, and combine the corrupted packet with one or more subsequent retransmissions to increase the probability of a successful decoding. Even if the retransmitted packet(s) contains errors, a good packet can be derived from the combination previously received corrupted transmissions. This process may be referred to as soft combining, and can include Chase Combining (CC) and/or Incremental Redundancy (IR). CC may be a basic combining approach wherein Node B may be simply retransmitting the exact same set of coded symbols of the original packet. With IR, different redundancy information may be sent during retransmissions by recoding the packet in a different manner, thus incrementally increasing the coding gain. To improve the speed of H-ARQ processing, the functionality may be implemented directly at the physical/Media Access Control (L1) layer of the UE 110.

The memory buffer 115 may reside in UE 110 in order to provide storage space for a variety of processing functions or services. A fixed portion of the memory buffer 115 may be devoted to Non-HSDPA services, such as, for example, data associated with Multimedia Broadcast Multicast Service (MBMS). The other portion of the memory, hereinafter referred to as a H-ARQ buffer, may be devoted to a fixed space for storing data associated with a specified number of HSDPA H-ARQ processes. Each H-ARQ process may be responsible for the delivery of HSDPA packets at the MAC-hs layer. This fixed number of H-ARQ processes is hereinafter referred to as "N", where the value of N may depend upon the network provider. The conventional H-ARQ buffer shown in FIG. 1 organizes data associated with H-ARQ processes using a static approach. Each H-ARQ process may be assigned an identifier (e.g., HSDPA H-ARQ1, HSDPA H-ARQ2, . . . , HSDPA H-ARQN) and be permanently assigned a fixed memory location, each memory location having a fixed size. This size may depend upon the number of H-ARQ processes and the HS-DSCH category designation FIG. 2 is an exemplary timing diagram 200 showing the interaction between Node B 105 and the UE 110. Packet data may be transferred over the HS-DSCH using time domain multiplexing, where each Transmission Time Interval (TTI) may consist of three slots, also known as a sub-frame (a 2 ms time period according to the standard, but other time periods may be contemplated). The data for the HS-DSCH is sent on the HS-PDSCH (High Speed Physical Downlink Shared Channels), which are code multiplexed within each TTI. Each data packet may be associated with a separate H-ARQ process which can correspond to a specific H-ARQ ID. Information associated with each HS-DSCH and its corresponding H-ARQ process is provided over the UEs 110 HS-SCCH, and precedes corresponding sub-frames in the HS-DSCH (TTIs) by 2 slots. In the example shown in FIG. 2, the H-ARQ IDs range from 1 to 6, and data packet 205 is associated with H-ARQ6 210. When a packet is received by the UE 110, the UE will attempt to decode the packet. If successful, the UE 110 will send an ACK to Node B 105 over the HS-DPCCH for the relevant H-ARQ. If the decoding is unsuccessful, the UE 110 will send a NACK to Node B 105 over the same channel. In order to better use the waiting time between acknowledgments, multiple processes can run for in UE 110 using separate TTIs. This technique may be referred to as N-"channel" SAW (N=6 in the illustrated example), wherein each "channel" corresponds to a specific H-ARQ process. When one process is awaiting an acknowledgment, the remaining N−1 processes may continue to transmit.

In the example shown in FIG. 2, for the first TTI, 7.5 slots after the end of the received packet associated with H-ARQ1, a NACK indication was sent during one slot by the UE 110 on the HS-DPCCH for H-ARQ1. The earliest (re)transmission on the same H-ARQ process (in this case H-ARQ1) may then occur 10 ms after the beginning of the previous transmission (i.e., 12 slots after the end of that transmission, taking into account time gaps allowed for decoding). The node B 105 may give priority to NACK signals to schedule a retransmission on the same H-ARQ at the earliest opportunity, or schedule the H-ARQ processes in a sequential manner irrespective of the ACK/NACK indication, or use any other method which satisfies the aforementioned timeline constraint set in the standard.

Because storing the data associated with each H-ARQ process utilizes memory resources within the UE 110, there is a need for methods and apparatus for H-ARQ process memory management in order to utilize memory in an intelligent and flexible manner. Conserving memory for H-ARQ processes can provide more memory for non-HSDPA services, and/or permit the design of UEs having smaller buffer memories, which may lead to lower production costs and/or reduced UE 110 power consumption.

SUMMARY

Exemplary embodiments of the invention are directed to apparatus and methods for H-ARQ process memory management.

One embodiment includes a method for dynamically managing memory for storing data associated with H-ARQ processes. The method includes receiving a packet associated with a H-ARQ process, determining if a free memory location is available in a H-ARQ buffer, assigning the packet to the free memory location, determining if the packet was successfully decoded, and retaining the packet in the assigned memory location for combination with a subsequent packet retransmission if the packet was not successfully decoded.

Another embodiment includes a method for managing the memory of a UE device. The method includes determining the available memory space for HSDPA H-ARQ processes, determining the memory amount for each H-ARQ process determining the number of H-ARQ process ($n_T$) which can be stored concurrently, determining if the total number of H-ARQ processes assigned for a given UE category exceeds $n_T$, and performing dynamic memory management for H-ARQ process storage if the total number of H-ARQ processes assigned for a given UE category exceeds $n_T$.

Yet another embodiment presented includes an apparatus for dynamically managing memory for storing data associated with H-ARQ processes. The apparatus includes means for receiving a packet associated with a H-ARQ process, means for determining if a free memory location is available in a H-ARQ buffer, means for assigning the packet to the free memory location, means for determining if the packet was successfully decoded, and means for retaining the packet in the assigned memory location for combination with a subsequent packet retransmission if the packet was not successfully decoded.

Another embodiment presented is an apparatus for managing the memory of a UE device. The apparatus includes means for determining the available memory space for HSDPA H-ARQ processes, means for determining the memory amount for each H-ARQ process, means for determining the number of H-ARQ process ($n_T$) which can be stored, means for determining if the total number of H-ARQ processes assigned for a given UE category exceeds $n_T$, and means for performing dynamic memory management for H-ARQ process storage if the total number of H-ARQ processes assigned for a given UE category exceeds $n_T$.

Yet another embodiment is an apparatus which includes logic configured to receive a packet associated with a H-ARQ process, logic configured to determine if a free memory location is available in a H-ARQ buffer, logic configured to assign the packet to the free memory location, logic configured to determining if the packet was successfully decoded, and logic configured to retain the packet in the assigned memory location for combination with a subsequent packet retransmission if the packet was not successfully decoded.

Another embodiment of the invention can include an apparatus comprising: logic configured to determine the available memory space for HSDPA H-ARQ processes; logic configured to determine the memory amount for each H-ARQ processes; logic configured to determine the number of H-ARQ process ($n_T$) which can be stored; logic configured to determine if the total number of H-ARQ processes assigned for a given UE category exceeds $n_T$; and logic configured to perform dynamic memory management for H-ARQ process storage if the total number of H-ARQ processes assigned for a given UE category exceeds $n_T$.

Another embodiment of the invention can include a computer-readable medium including program code stored thereon for dynamically managing memory for storing data associated with H ARQ processes, comprising: program code to receive a packet associated with a H-ARQ process; program code to determine if a free memory location is available in a H-ARQ buffer; program code to assign the packet to the free memory location; program code to determine if the packet was successfully decoded; and program code to retain the packet in the assigned memory location for combination with a subsequent packet retransmission if the packet was not successfully decoded.

Another embodiment of the invention can include a computer-readable medium including program code stored thereon for managing the memory of a UE device, comprising: program code to determine the available memory space for HSDPA H-ARQ processes; program code to determine the memory amount for each H-ARQ processes; program code to determine the number of H-ARQ process ($n_T$) which can be stored; program code to determine if the total number of H-ARQ processes assigned for a given UE category exceeds $n_T$; and program code to perform dynamic memory management for H-ARQ process storage if the total number of H-ARQ processes assigned for a given UE category exceeds $n_T$.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 3:
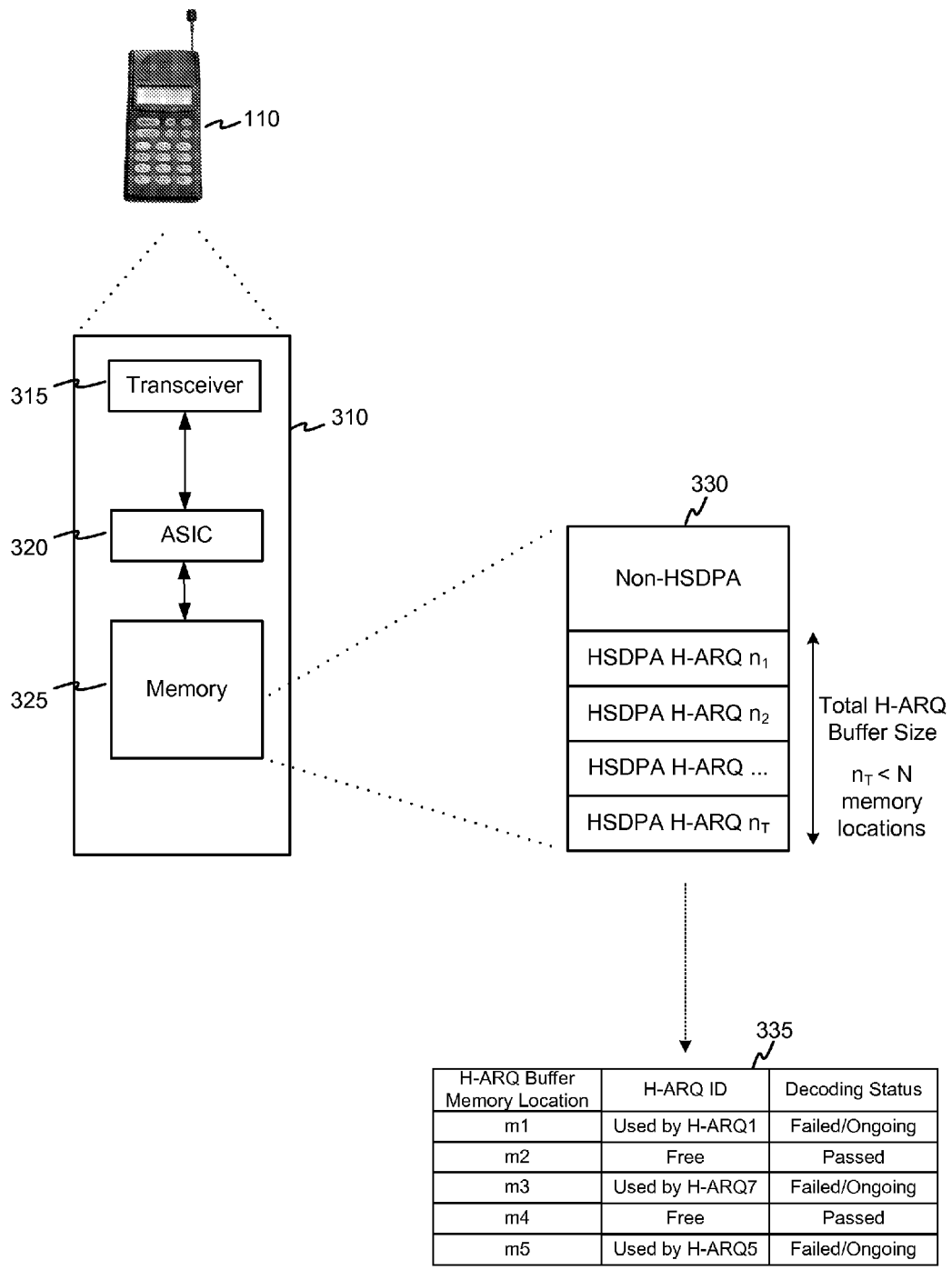
FIG. 3 illustrates a top-level block diagram of an exemplary UE device and the UE's associated H-ARQ buffer memory structure.

FIG. 3 illustrates a top-level block diagram of an exemplary UE 300 and the UE's associated Hybrid-ARQ (H-ARQ) buffer memory structure 330. The UE 300 is shown in FIG. 3 in the form of a cellular telephone; however, embodiments of the invention can be realized on any form of UE 300 which may perform digital communications over network 100. For example, the UE can be any device having wireless communication capabilities, including without limitation, wireless modems, PCMCIA cards, personal computers, telephones, or any combination or sub-combination thereof.

The UE 300 may have a platform 310 that can exchange data and/or commands over the network 100. The platform 310 can include a transceiver 315 operably coupled to an application specific integrated circuit ("ASIC") 320, or other processor, microprocessor, logic circuit, or any other data processing device. The ASIC 320 or other processor may execute an application programming interface ("API") layer that interfaces with any resident programs stored in the memory 325 of the UE 300. The memory 325 can be comprised of read-only and/or random-access memory (RAM and ROM), EEPROM, flash cards, or any memory common to such platforms.

Various communication protocol layers used by the wireless network 100 may also reside in the platform 310 which may execute various commands and processes at different layers (not shown in FIG. 3). The communication protocol layers may include, for example, a Radio Resource Control (RRC) layer, a Radio Link Control (RLC) layer, a Medium Access Control (MAC) layer, and a Physical Layer (L1). Information received for the physical layer may be decoded and transferred between the various layers MAC, RLC, and RRC. Consistent with the HSDPA standard introduced in 3GPP Release 5, the higher layers may transfer traffic data packets using a High-Speed Downlink Shared Channel (HS-DSCH). The same applies for the other HSDPA channels which include the uplink High Speed Dedicated Physical Control Channel (HS-DPCCH), which carries ACK/NACK feedback information, and the downlink High-Speed Shared Control Channel (HS-SCCH), which carries control information associated with the HS-DSCH.

A portion of memory 325 may be dedicated to a buffer 330, which may be apportioned to concurrently support data associated with both non-HSDPA services, which do not use H-ARQ functionality, and HSDPA H-ARQ processes. The amount of space in buffer 330 reserved for non-HSDPA services may be obtained from information signaled to the UE by the network using conventional techniques associated with the 3GPP WCDMA standard, and may be provisioned in a semi-static fashion, based on the UE 300 capability. Non-HSDPA services may include data associated with Multimedia Broadcast Multicast Service (MBMS), introduced in the Release 6 version of the standard, for supporting audio and video streams on WCDMA cellular networks. The portion of buffer space 330 dedicated to non-HSDPA services may be sized to store data for a configurable pool of WCDMA downlink channels, including for instance broadcast data carried over Shared-Common Control Physical Channel (S-CCPCH), and/or dedicated data associated with downlink radio bearers of the 64 kbps or 384 kbps class, carried over Dedicated Physical Data Channel (DPDCH).

Once the memory requirements for concurrent non-HSDPA services are taken into account, the space remaining in buffer 330 may be dedicated to storing the soft bits of HS-DSCH Transport Block Sizes, also referred as packets, associated with the H-ARQ processes. In accordance with the HS-DSCH physical layer (L1) categories provided in the Technical Specification 25.306 (release 5 or later) of the 3GPP WCDMA (FDD) standard, the H-ARQ buffer may be divided into smaller buffers which may be used for incremental redundancy (IR) recombination processing, each dedicated to one process. The information contained in all H-ARQ processes collectively is stored in a "virtual IR" buffer at Node B 105, consistent with the Technical specification 25.212. On each process, these soft bits represent the H-ARQ data stored between the two stages of HS-DSCH physical layer rate matching, a version of which is carried during each transmission. The individual buffers aforementioned are hereinafter referred to as H-ARQ buffer memory locations. Each H-ARQ buffer memory location may have a number of soft bits or size for each H-ARQ process, and there may be a total number of $n_T$ H-ARQ buffer memory locations residing in the H-ARQ buffer.

Figure 1:
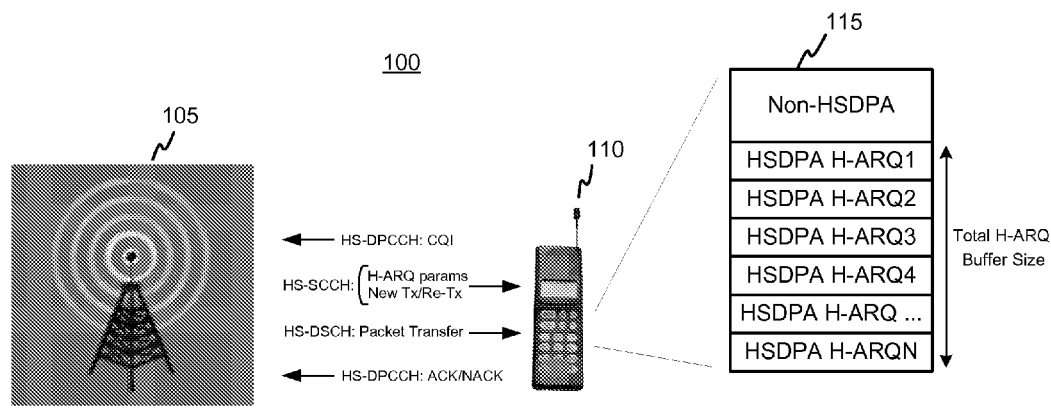
FIG. 1 depicts an exemplary top-level interaction between Node B and a User Equipment (UE) device having a conventional H-ARQ buffer structure.
Figure 2:
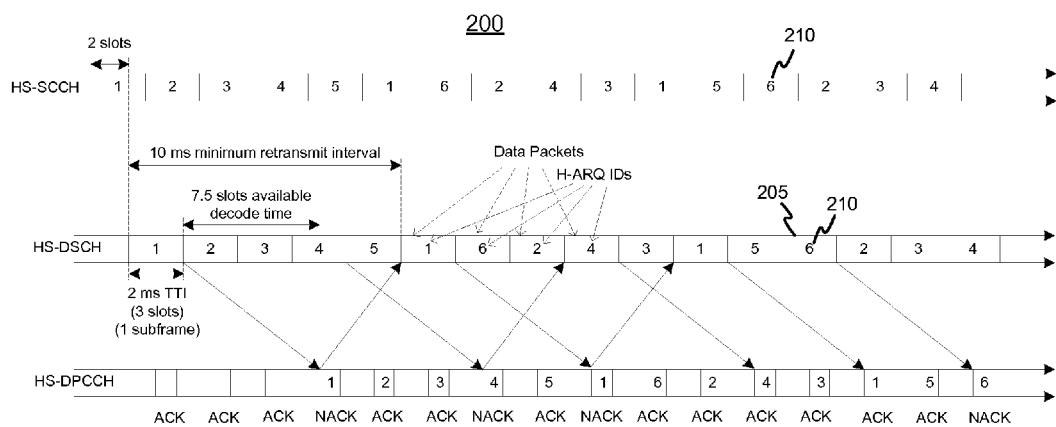
FIG. 2 is an exemplary timing diagram showing the interaction between Node B and the UE for HSDPA operation.

In various embodiments of the invention, HS-DSCH packets associated with H-ARQ processes are stored in H-ARQ buffer memory locations which are assigned in a dynamic manner, as opposed to the conventional approach of statically assigning each H-ARQ process its own memory location as shown in buffer 115, which was described above in relation to FIG. 1.

The size of each memory location may be dictated by the number of H-ARQ processes (when using "implicit partitioning" of the virtual IR buffer) and the HS-DSCH UE category designation, which may specify among other parameters, the total number of soft bits for all of the H-ARQ processes, the supported modulation scheme and number of code-multiplexed HS-PDSCH. The HS-DSCH category to be used may be signaled to the UE 300 by the network 100, after the UE has advertised its capability. Moreover, the total number of H-ARQ processes, hereinafter referred to as "N", may also be designated by the network 100, signaled through higher layers, and can be independent of the specified HS-DSCH category. In practice, N conventionally ranges from 6 to 8, which may be greater than the total number of memory locations in the H-ARQ buffer (i.e., $n_T<N$) according to embodiments of the invention. Note that even in such embodiments, the UE capability (category) advertised to the network should remain unchanged.

Accordingly, when using this so-called "implicit partitioning", the size of each H-ARQ buffer memory location may be determined for a given UE category by dividing the total number of soft bits by the total number of H-ARQ processes (i.e., H-ARQ_Buffer_Mem_Loc_Size=Total_Num_Soft_Bits/N). In a configuration with a UE of "higher" advertised HS-DSCH category than the network (i.e. greater number of soft bits requirement), the network may specify explicitly the common size of each H-ARQ buffer memory location to the (smaller) value obtained through implicit partitioning for the network category, to guarantee a two stage de-rate matching at the UE mirroring that of Node B 105. This is a particular case of "explicit partitioning" also encompassed by this embodiment. The number of H-ARQ buffer memory locations assigned, $n_T$, may be determined by taking the integer part of the ratio of the total size of the H-ARQ buffer to the size of the H-ARQ buffer memory location (i.e., $n_T$=int(Total_H-ARQ_Buffer_Size/H-ARQ_Buffer_Mem_Loc_Size)). The total size of the H-ARQ buffer may be approximated by subtracting the amount of memory dedicated to non-HSDPA services from the size of buffer 330. The amount of memory dedicated to non-HSDPA services may be supplied to the UE 300 by the network 100, and the size of buffer 330 is conventionally a known design parameter.

Figure 5:
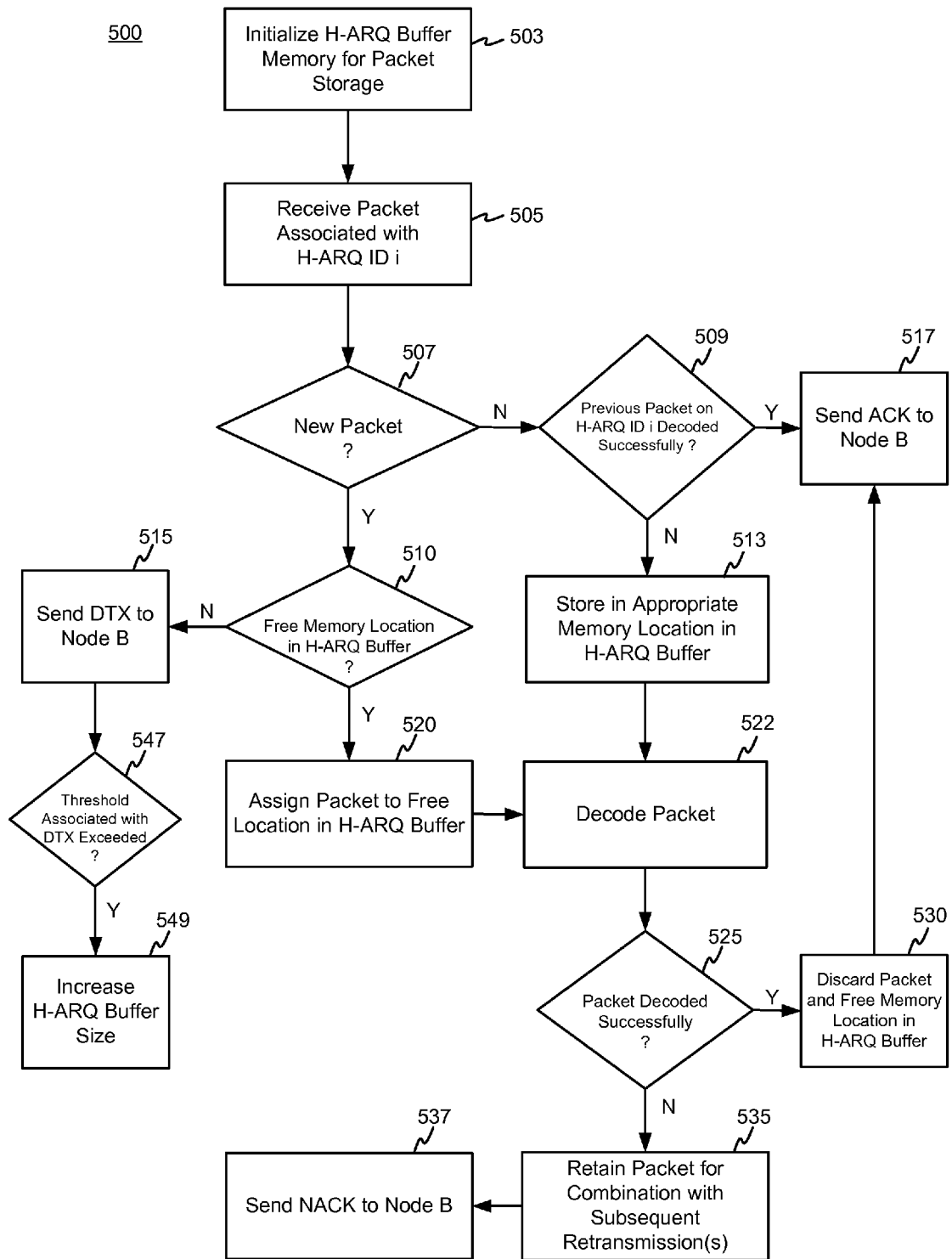
FIG. 5 is a flowchart of another exemplary process for dynamically managing memory for storing data associated with H-ARQ processes.

While the value for $n_T$ may initially be computed as described above, this value may be altered based upon the decoding performance of the network 100. In the ideal situation where the decoding performance of the UE 300 is perfect (block error rates being essentially zero), in one example the minimum value of $n_T$ is no more than three. For example in a specific system, this minimum value may be based upon the fact no more than 7.5 slots may be used for decoding time, that is, the processing of a single packet transmission for a H-ARQ process is no more than 2.5 TTI, based on the timeline requirement for the ACK or NACK feedback indication for that packet. Therefore, no more than three H-ARQ buffer memory locations are needed. In addition, the actual lower bound may be dependent upon the decoding time in a practical design, and could be lower if less than 7.5 slots are used. However, because the practical decoding performance will almost always be less than ideal (non-zero block error rates), $n_T$ should not larger or equal to a predetermined threshold based on the system design (e.g., three in the foregoing example). If the decoding performance of the UE 300 is acceptable, then the value of $n_T$ may be reduced from its initially computed value, as long as it is not reduce below a predetermined threshold (e.g., three). Alternatively, if the UE decoding performance becomes degraded, then the value of $n_T$ may be increased if needed by reducing the amount of memory space allocated to non-HSDPA services. This process is explained in more detail in the explanation of FIG. 5 presented below. Triggering such a low frequency procedure may be driven by an acceptable system level tradeoff between the concurrent non-HSDPA and HSDPA services, and the capability of system reconfiguration for the processing of non-HSDPA channels at the UE.

The number of H-ARQ buffer memory locations ($n_T$) may be smaller in various embodiments of the invention than the number of H-ARQ buffers (N) used in the conventional UE buffer 115. Accordingly, less memory may be utilized for H-ARQ processing, which in turn can increase the memory available for other processes. For example, more memory may be available for non-HSDPA services. Moreover, the reduction of memory constraints may also provide the additional advantage of designing UEs with smaller buffer memories, which can lead to lower production costs and reduced UE power consumption.

Further referring to FIG. 3, an overview of an embodiment's dynamic memory management approach can be explained using the memory mapping table 335. In this example, there are a total of five H-ARQ buffer memory locations ($n_T$=5) and seven H-ARQ processes (N=7). When an incoming new packet associated with a specific H-ARQ process arrives at the UE 300, it may be assigned to a free H-ARQ buffer memory location (additional description of the free memory locations will be provided below in relation to the description of FIGS. 4 and 5). In the mapping table 325, the next incoming packet may be stored in memory location m2. Once the packet is successfully decoded, the assigned memory location may be cleared for use by subsequent packets. If the packet does not get decoded successfully, the packet remains stored in the memory location for recombination with a subsequent version of the same packet associated with the same H-ARQ process using incremental redundancy or chase combining as the H-ARQ physical layer technique. In table 335, H-ARQ1 is currently being stored in H-ARQ buffer location m1, H-ARQ7 is stored in H-ARQ buffer memory location m4, and H-ARQ5 is stored in H-ARQ buffer memory location m5. In these cases, the decoding status of these H-ARQ processes is either ongoing or failed. The H-ARQ buffer memory locations m2 and m4 have been freed for use by subsequent incoming packets. As will be more fully explained below, if all of the H-ARQ buffer memory locations are filled when the next new incoming packet arrives at the UE 300, that new packet will be discarded and no decoding will be attempted, and the UE will send a discontinuous transmission (DTX) signal in lieu of feedback so that Node B 105 may typically retransmit a packet which is self decodable (in particular, a $1^{st}$ transmission version of the packet which does not have any systematic bits punctured).

Accordingly, an embodiment of the invention can include the UE 300 including the ability to perform the functions described herein. The various logic elements can be embodied in discrete elements, software modules executed on a processor or any combination of software and hardware to achieve the functionality disclosed herein. For example, the ASIC 320 and the memory 325 may all be used cooperatively to load, store and execute the various functions disclosed herein and thus the logic to perform these functions may be distributed over various elements. Alternatively, the functionality could be incorporated into one discrete component (e.g., in embedded memory in the ASIC/processor 320). Therefore, the features of the UE 300 in FIG. 3 are to be considered merely illustrative and the invention is not limited to the illustrated features or arrangement.

Figure 4:
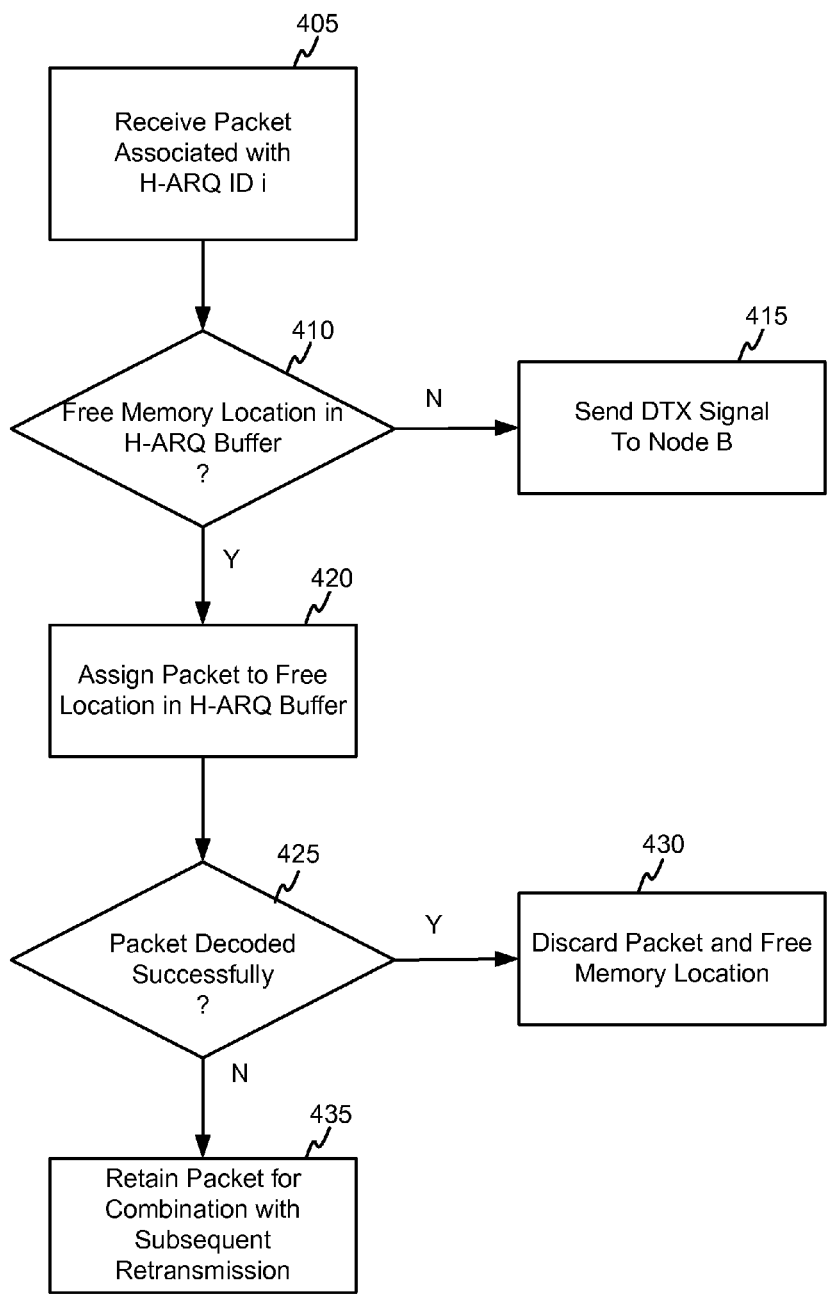
FIG. 4 is a top-level flowchart showing an exemplary process for dynamically managing memory for storing data associated with H-ARQ processes.

FIG. 4 is a top-level flowchart showing an exemplary process 400 for dynamically managing memory for storing data associated with H-ARQ processes. This process may be executed by the ASIC 320 in UE 300. For ease of description, process 400 is shown as a serial process operating on consecutive packets which may be associated with a given H-ARQ process; however, it should be appreciated that the UE may be executing various blocks of process 400 in a non-synchronous manner for packets received in consecutive TTIs and associated with different H-ARQ processes.

Process 400 may start when a packet is received by the UE 300 over the HS-DSCH from Node B 105 (Block 405). The received packet may be associated with a specific H-ARQ i, and the H-ARQ parameters may be provided to the UE 300 over the HS-SCCH. The UE 300 may then determine if a free memory location exists in the H-ARQ buffer (Block 410). If no free location exists, the packet is effectively dropped and the UE 300 may send a DTX signal Node B 105 (Block 415) in lieu of uplink feedback (ACK or NACK). Upon receiving the DTX, Node B 105 may retransmit a self decodable packet, which is associated with H-ARQ i, at some point after the minimum retransmit interval per process (e.g., 10 ms). The design should be such that dropping packets in this manner should not have an appreciable impact on network throughput performance and capacity. For the purpose of this design it may be observed that this happens when the number of previously received H-ARQ processes that have failed or are still currently being decoded is sufficient to fill up the $n_T$ buffer memory locations.

If it is determined that a free memory location exists in the H-ARQ buffer in Block 410, the UE 300 may assign the received packet to a free memory location in the H-ARQ buffer (Block 420). In order to minimize the possibility of overwriting and losing a packet if the non-HSDPA memory buffer is later expanded, received packets may be assigned to the free memory location distal to the non-HSDPA memory partition. The UE 300 will then determine if the received packet was successfully decoded (Block 425). This determination may be made by utilizing the Cyclic Redundancy Check (CRC) which can be performed in L1, for example. If the packet is successfully decoded, the UE 300 will discard the packet and free the H-ARQ buffer memory location (Block 430). If the packet was not successfully decoded, the packet will be retained for soft combining with a subsequent retransmission of that packet associated with H-ARQ ID i (Block 435). Consistent with the Technical Specification 25.212 of the 3GPP WCDMA/HSDPA standard, the retransmitted version may have different punctured bits (Incremental Redundancy) in order to increase effective coding gain, and decoding efficiency. The recombination of the original (or previously sent) packet with the retransmitted packet may improve the packet's Signal-to-Noise ratio and can increase the probability of a successful decode operation.

Accordingly, an embodiment of the invention may include a method for dynamically managing memory for storing data associated with H-ARQ processes. The method may include receiving a packet associated with a H-ARQ process (Block 405), determining if a free memory location is available in a H-ARQ buffer (Block 410), assigning the packet to the free memory location (Block 420), determining if the packet was successfully decoded (Block 425), and retaining the packet in the assigned memory location for combination with a subsequent packet retransmission if the packet was not successfully decoded (Block 425). One should appreciate that the method, or any portions thereof, may be implemented in software, firmware, and/or in any combination/sub-combination thereof, for execution on the ASIC 320. Of course, this method is not limited to execution on an ASIC, but may also be executed on any type of processor and/or hardware, and may have execution divided up among a plurality of processors and/or sub-processors.

FIG. 5 is a flowchart of another exemplary process 500 for dynamically managing memory for storing data associated with H-ARQ processes. As discussed above, process 500 may be shown as a serial process operating on consecutive packets which may be associated with a given H-ARQ process. However, the UE may be executing various blocks of process 500 in a non-synchronous manner for received packets associated with other parallel H-ARQ processes.

Process 500 may start by initializing the H-ARQ buffer memory for packet storage (Block 503). This may entail determining the H-ARQ buffer memory location size per process, and the total number of H-ARQ buffer memory locations ($n_T$). This determination may be performed as explained in detail above for the description of FIG. 3. However, the space remaining for the H-ARQ processes should not be arbitrarily small, and a check could be performed to ensure that enough memory within buffer 330 is provisioned for the total H-ARQ buffer size to permit acceptable decoding performance.

A packet may be received by the UE 300 over the HS-DSCH from Node B 105 (Block 505). The UE 300 may check to see if the received packet is a new packet (Block 507). If the packet is a new packet, the UE 300 may determine if a free memory location exists in the H-ARQ buffer (Block 510). If no free location exists, the packet is effectively dropped, no decoding is attempted, and the UE 300 may send a DTX signal to Node B 105 (Block 515). The UE 300 may then determine if a threshold fraction of number of dropped packets out of received packets to be decoded during a certain time interval has been exceeded (Block 547). If so, the UE 300 may increase the H-ARQ buffer size by increasing $n_T$ by one (Block 549). The extent of the time interval window may be designed such that changes in $n_T$ can be reduced, while still avoiding significant performance degradation. Upon receiving the DTX signal, Node B 105 may retransmit typically a self decodable version of the packet for a first transmission, which may be associated with H-ARQ ID i, at some point after a retransmit interval (e.g., 10 ms).

If it is determined that a free memory location exists in the H-ARQ buffer in Block 510, the UE 300 may assign the received packet to a free memory location in the H-ARQ buffer (Block 520). In order to minimize the possibility of overwriting a packet if the non-HS memory buffer is expanded, received packets may be assigned to the free memory location distal to the non-HSDPA memory partition. The UE 300 may decode the received packet (Block 522). The UE 300 may then determine if the received packet was successfully decoded (Block 525).

If the packet is successfully decoded, the UE 300 will discard the packet and free the H-ARQ buffer memory location (Block 530), and may send an ACK signal to Node B 105 (Block 517). If the packet was not successfully decoded, the packet will be retained for combination with a subsequent retransmission of the same packet associated with H-ARQ ID i (Block 535). A NACK signal may also be sent to Node B (Block 537). Consistent with the HSDPA standard, the retransmitted block may have a different set of punctured bits from the previous version, in order to increase decoding efficiency. The recombination of the original (or previously sent) packet with the retransmitted packet may improve the packet's Signal-to-Noise ratio and can increase the probability of a successful decode operation.

If it is determined that the received packet is not a new packet (Block 507), the UE 300 may determine if the previous packet on H-ARQ ID i was decoded successfully (Block 509). If so, the UE 300 sends an ACK signal to Node B (Block 517) and does not attempt decoding. If it is determined that the previous packet on H-ARQ ID i was not decoded successfully (Block 509), the UE 300 will execute Blocks 513, 522, and 525.

Accordingly, an embodiment of the invention may include a method for dynamically managing memory for storing data associated with H-ARQ processes. The method may include initializing a H-ARQ buffer for packet storage (Block 503), receiving a packet associated with a H-ARQ process (Block 505), determining if the received packet is a new packet (Block 507), determining if the previous packet associated with the H-ARQ process decoded successfully if the received packet is not a new packet (Block 509), and sending an acknowledgement (ACK) signal to Node B if the previous packet associated with the H-ARQ decoded successfully (Block 517).

The method may further include determining if a free memory location is available in a H-ARQ buffer (Block 510), assigning the packet to the free memory location (Block 520), decoding the packet (Block 522), determining if the packet was successfully decoded (Block 525), retaining the packet in the assigned memory location for combination with a subsequent packet retransmission if the packet was not successfully decoded (Block 535), and sending a NACK to Node B (Block 537).

The method may further include sending a discontinuous transmission (DTX) signal to Node B if there is no free memory location available in the H-ARQ buffer (Block 515), determining if a threshold associated with DTX signals has been exceeded (Block 547), and modifying the H-ARQ buffer memory size base when the threshold associated with DTX signals is exceeded (Block 549). Wherein it is determined that the previous packet associated with the H-ARQ process was not decoded successfully, the method may further include storing the received packet in the appropriate memory location in the H-ARQ buffer (Block 513), and decoding the received packet (Block 522). The method may further include discarding the received packet from the assigned memory location and freeing the assigned memory location in the H-ARQ buffer (Block 530), and sending an ACK signal to Node B (Block 517).

Figure 6:
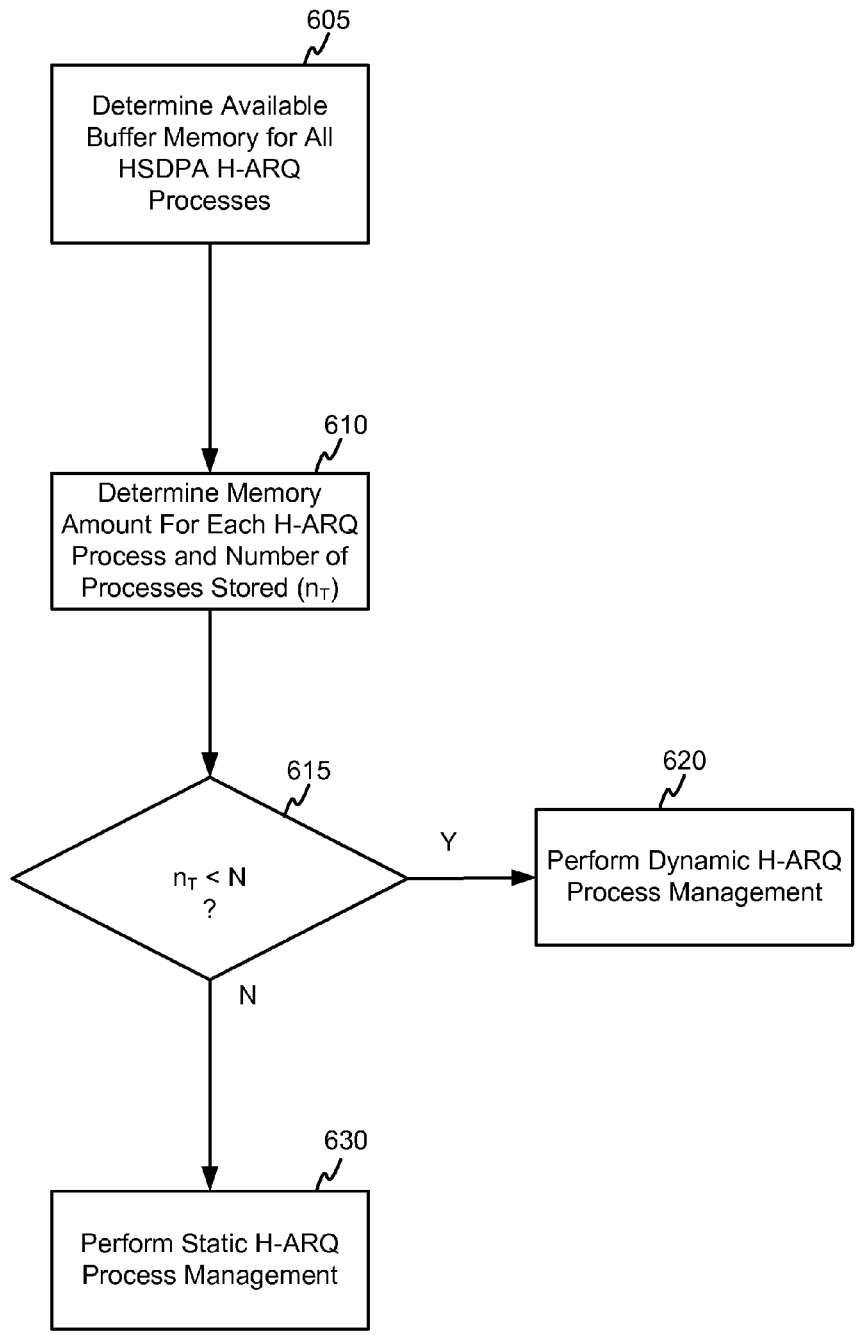
FIG. 6 is a flowchart showing an exemplary process for determining the type of memory management technique used by the UE.

FIG. 6 is a flowchart showing an exemplary process for determining the type of memory management technique used by the UE 300. The process may start by determining the available memory in buffer 330 for all H-ARQ processes (e.g., determine the total H-ARQ buffer size shown in FIG. 3) (Block 605). The UE 300 may then determine the amount of memory used by each H-ARQ process, and subsequently the number of H-ARQ buffer memory locations $n_T$ associated with current HSDPA category (Block 610). The UE 300 may determine if the number of H-ARQ buffer memory locations ($n_T$) is less than the total number of H-ARQ processes. If so, the UE will perform dynamic H-ARQ process management. If $n_T$ is equal to N, the UE 300 may perform conventional static H-ARQ process management. Examples of techniques for determining $n_T$ and the total H-ARQ buffer size were described above in the description of FIG. 3, for example.

Accordingly, an embodiment of the invention may include a method for managing the memory of a UE device. The method may include determining the available memory space for HSDPA H-ARQ processes (Block 605), determining the memory amount for each H-ARQ process and determining the number of H-ARQ processes ($n_T$) which can be stored (Block 610), determining if the total number of H-ARQ processes assigned for a given UE category exceeds $n_T$ (Block 615), and performing dynamic memory management for H-ARQ process storage if the total number of H-ARQ processes assigned for a given UE category exceeds $n_T$ (Block 620). As described above, the entire method or portions thereof may be performed in software, firmware, or any combination thereof.

It should be noted that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, it should be noted that at the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying methods for H-ARQ processes memory management as disclosed herein. Further, the invention is not limited to illustrated examples and any means for performing the functionality described herein are included in embodiments of the invention. For example, the methods, sequences and/or algorithms described herein may be performed by logic configured to perform the disclosed functionalities.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for dynamically managing memory for storing data associated with hybrid automatic repeat request (H-ARQ) processes, comprising:
  receiving a packet associated with a H-ARQ process;
  determining if a free memory location is available in a H-ARQ buffer;
  sending a discontinuous transmission (DTX) signal to a Node B if there is no free memory location available in the H-ARQ buffer;
  assigning the packet to the free memory location;
  determining if the packet was successfully decoded; and
  retaining the packet in the assigned memory location for combination with a subsequent packet retransmission if the packet was not successfully decoded.

2. The method of claim 1, further comprising:
  determining if a threshold associated with a number of sent DTX signals has been exceeded; and modifying the H-ARQ buffer memory size base when the predetermined number of sent DTX signals is exceeded.

3. The method of claim 2, wherein modifying the H-ARQ buffer memory size further comprises:
reducing the amount of memory space assigned to non-High-Speed Downlink Packet Access (HSDPA) services, and increasing the amount of memory assigned to the H-ARQ buffer.

4. The method of claim 1, further comprising:
determining if the received packet is a new packet; and
determining if a previous packet associated with the H-ARQ process decoded successfully if the received packet is not a new packet.

5. The method of claim 4, wherein if it is determined the previous packet associated with the H-ARQ process was not decoded successfully, the method further comprising:
storing the received packet in a corresponding memory location in the H-ARQ buffer if it is determined the previous packet associated with the H-ARQ process was not decoded successfully; and
decoding the received packet.

6. The method of claim 4, further comprising:
sending a Negative Acknowledgement (NACK) signal if the received packet was not decoded successfully.

7. The method of claim 4, wherein if the received packet was decoded successfully, the method further comprising:
discarding the received packet from the assigned memory location;
freeing the assigned memory location in the H-ARQ buffer; and
sending an Acknowledgement (ACK) signal to a Node B.

8. The method of claim 1, wherein the packet is assigned to the free memory location which is distal from the memory space associated with non-high speed (HS) services.

9. The method of claim 1, further comprising:
performing the method of claim 1 for subsequently received packets, wherein each packet is associated with a H-ARQ ID.

10. An apparatus for dynamically managing memory for storing data associated with hybrid automatic repeat request (H-ARQ) processes, comprising:
means for receiving a packet associated with a H-ARQ process;
means for determining if a free memory location is available in a H-ARQ buffer;
means for sending a discontinuous transmission (DTX) signal to a Node B if there is no free memory location available in the H-ARQ buffer;
means for assigning the packet to the free memory location;
means for determining if the packet was successfully decoded; and
means for retaining the packet in the assigned memory location for combination with a subsequent packet retransmission if the packet was not successfully decoded.

11. The apparatus of claim 10, further comprising:
means for determining if a predetermined number of sent DTX signals has been exceeded; and
means for modifying the H-ARQ buffer memory size base when the predetermined number of sent DTX signals is exceeded.

12. The apparatus of claim 11, wherein the means for modifying the H-ARQ buffer memory size further comprises:
means for reducing the amount of memory space assigned to non-High-Speed Downlink Packet Access (HSDPA) services, and increasing the amount of memory assigned to the H-ARQ buffer.

13. The apparatus of claim 10, further comprising:
means for determining if the received packet is a new packet; and
means for determining if the previous packet associated with the H-ARQ process decoded successfully if the received packet is not a new packet.

14. The apparatus of claim 13, further comprising:
means for storing the received packet in a corresponding memory location in the H-ARQ buffer; and
means for decoding the received packet.

15. The apparatus of claim 13, further comprising:
means for sending a Negative Acknowledgement (NACK) signal if the received packet was not decoded successfully.

16. The apparatus of claim 13, further comprising:
means for discarding the received packet from the assigned memory location;
means for freeing the assigned memory location in the H-ARQ buffer; and
means for sending an acknowledgement (ACK) signal to a Node B.

17. The apparatus of claim 10, wherein the packet is assigned to the free memory location which is distal from the memory space associated with non-high speed (HS) services.

18. The apparatus of claim 10, further comprising:
means for performing the method of claim 1 for subsequently received packets, wherein each packet is associated with a H-ARQ ID.

19. An apparatus comprising:
logic configured to receive a packet associated with a hybrid automatic repeat request (H-ARQ) process;
logic configured to determine if a free memory location is available in a H-ARQ buffer;
logic configured to send a discontinuous transmission (DTX) signal to a Node B if there is no free memory location available in the H-ARQ buffer;
logic configured to assign the packet to the free memory location;
logic configured to determine if the packet was successfully decoded; and
logic configured to retain the packet in the assigned memory location for combination with a subsequent packet retransmission if the packet was not successfully decoded.

20. The apparatus of claim 19, further comprising:
logic configured to determine if a threshold associated with a number of sent DTX signals has been exceeded; and
logic configured to modify the H-ARQ buffer memory size base when the predetermined number of sent DTX signals is exceeded.

21. A non-transitory computer-readable medium including program code stored thereon for dynamically managing memory for storing data associated with hybrid automatic repeat request (H-ARQ) processes, comprising:
program code to receive a packet associated with a H-ARQ process;
program code to determine if a free memory location is available in a H-ARQ buffer;
program code to send a discontinuous transmission (DTX) signal to a Node B if there is no free memory location available in the H-ARQ buffer;
program code to assign the packet to the free memory location;

program code to determine if the packet was successfully decoded; and program code to retain the packet in the assigned memory location for combination with a subsequent packet retransmission if the packet was not successfully decoded.

* * * * *